US008683339B2

(12) United States Patent
Gupta et al.

(10) Patent No.: US 8,683,339 B2
(45) Date of Patent: *Mar. 25, 2014

(54) INTELLIGENT CONTENT ORGANIZATION BASED ON TIME GAP ANALYSIS

(75) Inventors: Mohit Gupta, Noida (IN); Mark Dahm, Gilroy, CA (US)

(73) Assignee: Adobe Systems Incorporated, San Jose, CA (US)

( * ) Notice: Subject to any disclaimer, the term of this patent is extended or adjusted under 35 U.S.C. 154(b) by 246 days.

This patent is subject to a terminal disclaimer.

(21) Appl. No.: 12/803,700

(22) Filed: Jul. 2, 2010

(65) Prior Publication Data

US 2010/0281084 A1    Nov. 4, 2010

Related U.S. Application Data

(63) Continuation of application No. 11/607,278, filed on Nov. 30, 2006, now Pat. No. 7,779,358.

(51) Int. Cl.
*G06F 3/00* (2006.01)

(52) U.S. Cl.
USPC .......................................................... 715/730

(58) Field of Classification Search
USPC ................................... 715/730, 767, 838, 851
See application file for complete search history.

(56) References Cited

U.S. PATENT DOCUMENTS

| 6,990,637 | B2 * | 1/2006 | Anthony et al. | 715/851 |
| 7,117,453 | B2 * | 10/2006 | Drucker et al. | 715/833 |
| 2005/0165841 | A1 * | 7/2005 | Kasperkiewicz et al. | 707/104.1 |
| 2009/0064049 | A1 * | 3/2009 | Pyhalammi et al. | 715/838 |

* cited by examiner

*Primary Examiner* — Thanh Vu
(74) *Attorney, Agent, or Firm* — Kilpatrick Townsend & Stockton LLP

(57) ABSTRACT

Gap values for a collection of images are obtained; each gap value is a temporal difference between temporally adjacent images. A first grouping of the collection of images into one or more groups is determined based at least in part on the gap values. The first grouping is performed such that each group is temporally contiguous. The first grouping is presented and input from a user is received in response to the presented first grouping. A second grouping of the collection of images into two or more groups is determined based at least in part on the user input. The second grouping is presented.

23 Claims, 8 Drawing Sheets

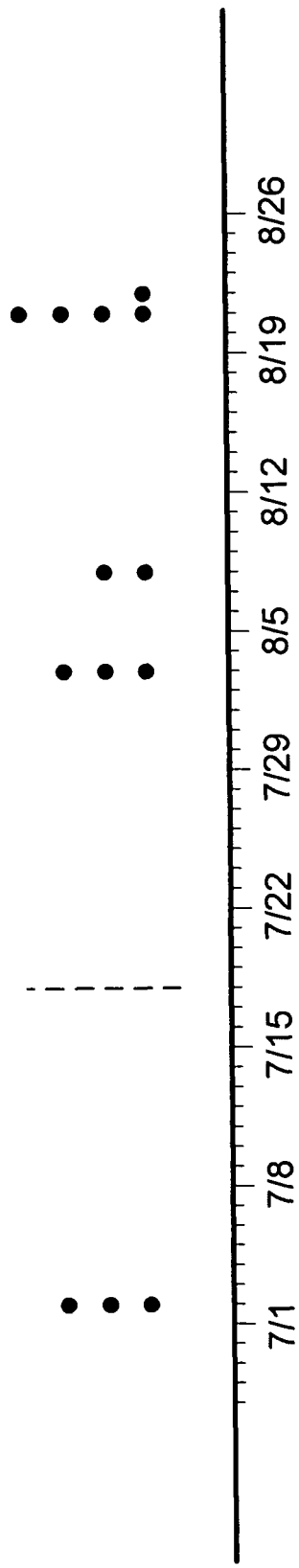

US 8,683,339 B2

INTELLIGENT CONTENT ORGANIZATION BASED ON TIME GAP ANALYSIS

CROSS REFERENCE TO OTHER APPLICATIONS

This application is a continuation of U.S. patent application Ser. No. 11/607,278, filed on Nov. 30, 2006, now U.S. Pat. No. 7,779,358, the contents of which are incorporated herein by reference in their entirety.

BACKGROUND OF THE INVENTION

With the proliferation of digital cameras, camcorders, and camera phones, more and more digital audiovisual content is being captured. In some cases, existing applications and tools provide insufficient organization techniques and users are required to spend a significant amount of manual effort organizing audiovisual content. For example, a user may wait until the removable storage media in her camera gets full before downloading the images. Some download applications download photographs to a single target directory, requiring the user to manually move the images into appropriate folders (e.g., associated with the various events at which pictures were taken), manually tag photographs, manually name each photograph, etc. It would be desirable if improved techniques for organizing audio and/or visual content were developed.

BRIEF DESCRIPTION OF THE DRAWINGS

Various embodiments of the invention are disclosed in the following detailed description and the accompanying drawings.

FIG. 5A is a diagram illustrating an embodiment of a grouping after a first iteration of a grouping process is performed.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
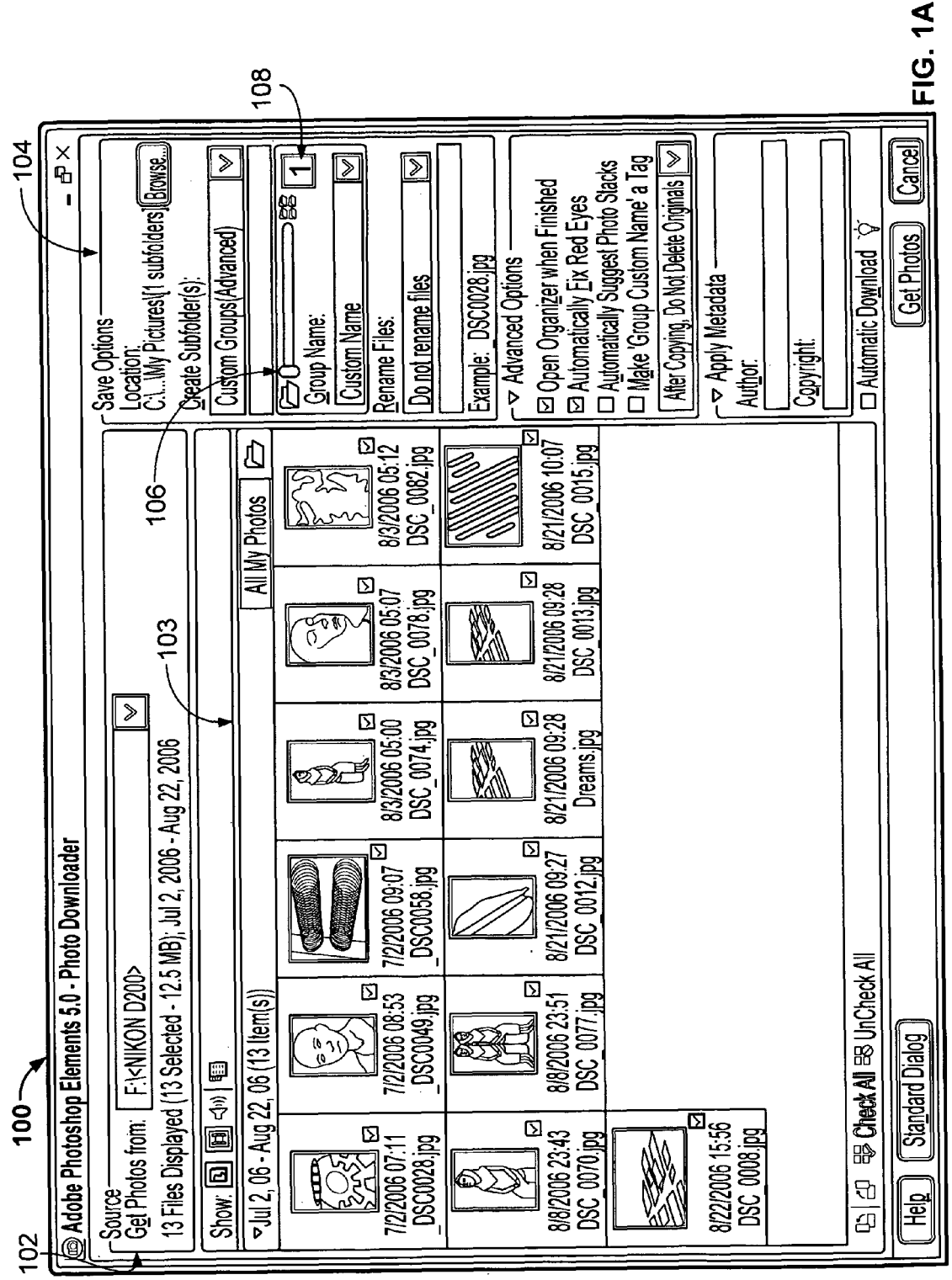
FIG. 1A is a diagram illustrating an embodiment of a download interface.

FIG. 1A is a diagram illustrating an embodiment of a download interface. In the example shown, download interface 100 is part of or otherwise associated with Adobe® Photoshop® Elements, which is a software application for editing, organizing, and laying out digital images. Using download interface 100, a user is able to obtain photographs (e.g., stored on removable storage media via a card/media reader or from a camera via a Universal Serial Bus (USB) connection) and move them to a target location, such as a directory in the file system of a user's computer.

In source portion 102 of download interface 100, a user is able to specify a source location where images to be downloaded are obtained from (e.g., with respect to a file system of a computer this application is running on). In this example, the source specified by the user is F:\<NIKON D200>. In the example shown, download interface 100 is refreshed when a source location is specified in source portion 102. The source location F:\<NIKON D200> is accessed, all image files stored in that location are determined (if any), and thumbnails are displayed for those image files in thumbnail region 103.

For each image, a thumbnail, check box, file name, and a creation date and time are displayed in thumbnail region 103. Using an appropriate checkbox, a user is able to deselect an image and the deselected image is not downloaded when the download process is triggered. For example, the files "Dreams.jpg" and "DSC_0013.jpg" are similar and the user may not necessarily want to download both images. In some cases, a thumbnail is sufficient for a user to determine that an image is of poor quality and a user deselects a corresponding check box so the image is not downloaded.

In the example shown, the file names and creation dates/times displayed in thumbnail region 103 are obtained from and stored as metadata with an image file. Some example metadata standards include Exchangeable image file format (Exif), International Press Telecommunications Council (IPTC), and Extensible Metadata Platform (XMP). In some embodiments, other types of media are used besides still images and appropriate metadata formats or standards are used.

Via location portion 104, a user is able to specify a target location to which the selected images are to be transferred. In this example, the target location is specified to be C:\...\My Pictures where some intermediate portion of the file system path is not specified (e.g., because of limited display space in location portion 104). In some embodiments, a target location is associated with a remote location (e.g., with respect to a user's device) as in the case of uploading content to a remote server, such as a web server or a file server. In the state shown in this figure, the images would be downloaded into a single folder in the directory My Pictures if the download process were to be initiated in the current state.

What is disclosed is a technique for grouping of images and changing the grouping in response to user input (e.g., prior to or otherwise associated with a download process). An initial grouping is presented in thumbnail region 103 where all the images are in a single group. To adjust the grouping shown in thumbnail region 103, a user moves slider 106 which is currently in the left-most position. Using a mouse, stylus, or other appropriate input device, a user may (if so desired) adjust slider 106 to cause the grouping shown in thumbnail region 103 to change. The effect of moving slider 106 is indicated to the user by the folder icons to the right and left of the slider rail. The folder icon to the left of the slider rail is a single folder, indicating that if the user moves slider 106 to the left the number of folders will decrease. The folder icon on the right has multiple folders, indicating that moving slider 106 to the right causes the number of folders to increase. Folder count 108 displays the current number of folders, which in this state shown is a single folder.

Figure 1B:
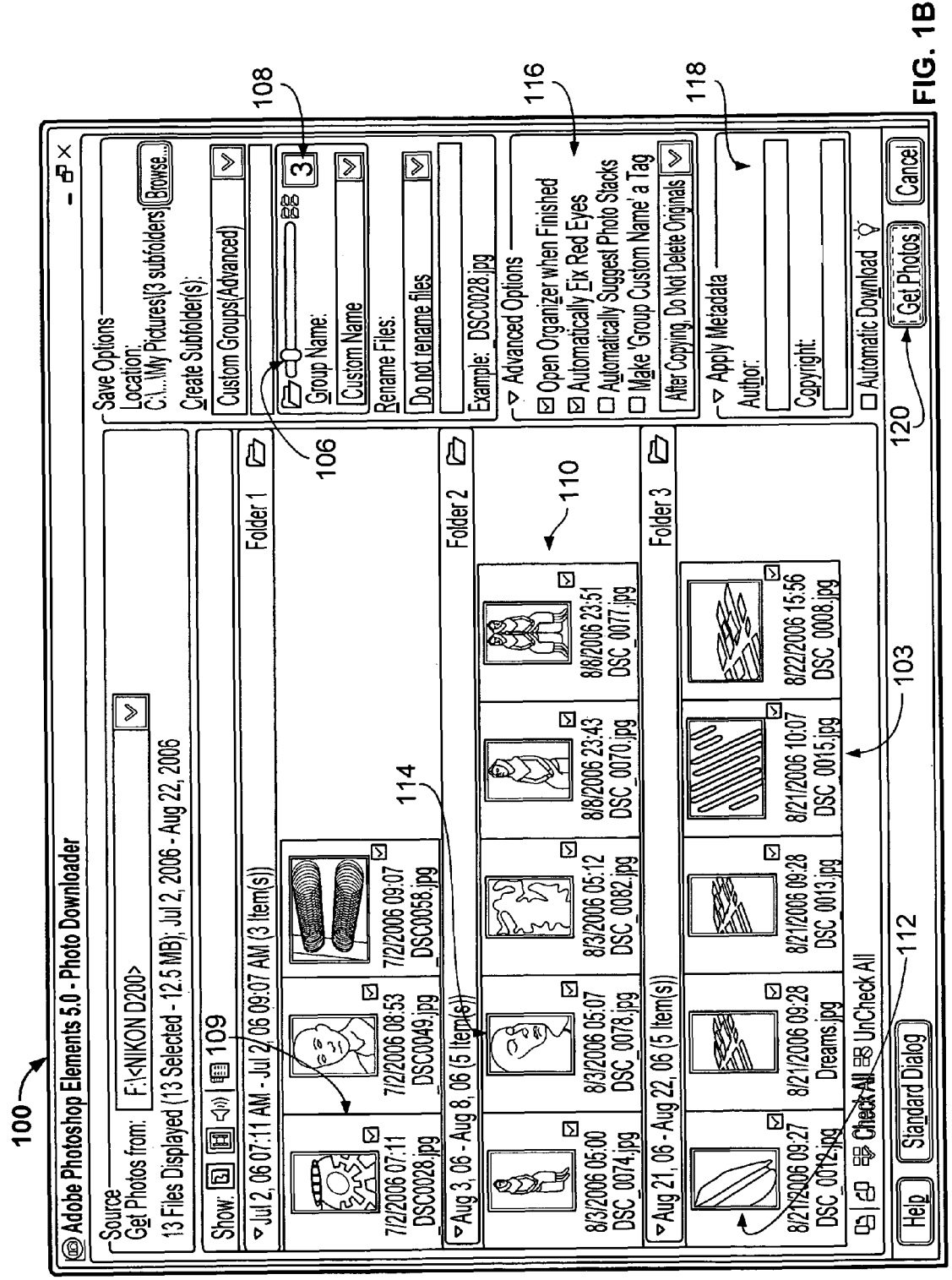
FIG. 1B is a diagram illustrating an embodiment of a download interface after a user has adjusted a slider.

FIG. 1B is a diagram illustrating an embodiment of a download interface after a user has adjusted a slider. In the example shown, slider 106 has been moved to the right compared to the state shown in FIG. 1A, for example by pressing the left button of a mouse and dragging slider 106 to the right while holding down on the mouse button. In this example, portions of download interface 100 are refreshed in real time as slider 106 is moved, for example without a user necessarily releasing a mouse button. Two such portions that are refreshed in real time are thumbnail region 103 and folder count 108. Moving slider 106 to the right has caused the number of folders to increase from one to three and folder count 108 now indicates there are three folders. Similarly, thumbnail region 103 has been refreshed to show the three groups of images.

Within thumbnail region 103, thumbnails and associated metadata are displayed in rows corresponding to the particular group an image belongs to. Since this is a download related interface, images in a group are downloaded into a folder together. The first group is associated with Folder 1 and includes three images, which are shown in the first row. Images associated with the second and third groups occupy the second and third rows, respectively, and each group includes five images. If a download were initiated in the state shown, the images in the first, second, and third groups would be downloaded into Folders 1, 2, and 3, respectively.

In some applications, being able to adjust or otherwise control the grouping of images is attractive. For example, some users may wait until the removable storage media in their digital camera is full before downloading their photographs to their computer. Depending upon, e.g., the capacity of the removable storage media and the camera's configurations, there may be a hundred or more photographs to download. The number of photographs to download, a relatively slow connection (e.g., a USB connection), and/or a relatively slow access time associated with some removable storage media may cause the overall download time to be significant. Using other interfaces or systems, the user may have to wait for the images to be transferred to a single folder (which may take a significant amount of time), and then move the images from the single folder to appropriate folders, naming the folders/images, etc. Or, a user may have to select appropriate images to go into one folder, wait for the selected images to be downloaded to the specified folder, and then repeat the process for each additional folder with some other systems. A user may not want to wait around waiting for this to happen.

A user may instead prefer to set up the download configuration (e.g., adjusting the number of folders, the folder names, and/or images assigned to folders), initiate the actual download or transfer of files, and then go away to do something else.

In this example, a process for grouping images (e.g., in response to slider 106) maintains a temporal ordering and each group of images is temporally contiguous. A group of images is defined to be temporally contiguous if the group contains all images with creation dates/times that are between the earliest and latest creation dates/times associated with that group. In some cases, a user has indicated that a particular image will not be downloaded or otherwise organized and that image is not considered when evaluating whether a group is temporally contiguous. As a counterexample of a group that is not temporally contiguous, if three photographs are taken right after each other and the first and third photograph are in one group and the second photograph is in another group, those groups are not temporally contiguous. In some embodiments, temporally contiguous grouping does not need to be enforced when a user manually changes the number of groups and/or assigns an image to a new group. For example, some systems may be configured to permit a user to move thumbnail 114 into the first group (i.e., the first row) or the third group (i.e., the third row) even though the grouping will no longer be temporally contiguous. In some applications, the user is considered to be the authority and the user is permitted to make any change he desires.

In some cases, there is a jump in the number of groups when slider 106 is moved (e.g., the number of groups goes directly from one to three, bypassing two groups). A jump in the number of groups may be dependent upon the particular creation dates and times of the images to be downloaded. For example, one set of images may have a jump in the number of groups when slider 106 is adjusted whereas another set of images may not necessarily have a jump in the number of groups when slider 106 is adjusted. In some embodiments, a jump in the number of groups depends on the particular grouping process used. For example, one back-end grouping process (e.g., configured to receive information from slider 106 and adjust the groups shown in thumbnail region 103) may sometimes produce a jump in the number of groups whereas another process may not.

In some embodiments, a user can manually control the number of groups, the particular set of images associated with each folder, etc. For example, a user may be able to merge two adjacent groups together (i.e., reducing the number of folders) or specify where to divide a folder (i.e., increasing the number of folders). A variety of interactions with download interface 100 may be used. In some embodiments, a user places a cursor above a line between two snapshots, such as line 109. Right clicking a mouse while a cursor at this position may cause a list of operations to be present to the user, include an option associated with dividing the folder at the point specified. By selecting that option from the presented list, folder 1 is divided at the point specified and the folder names may be adjusted to reflect the new folder. For example, folder 1 would occupy the first row and include a single image. Folder 2 would occupy the second row and include two images. Folders 2 and 3 would be renamed folders 3 and 4, respectively, and still contain five images each. In some embodiments, some other interaction is used, such as dragging and dropping.

Similarly, a user may be able to manually merge or combine two groups together. In the example shown, a user may be able to place her cursor above line 110 (located after the last thumbnail of the second group) and press the delete key, causing the second and third groups to be combined into a single group that includes ten images. Alternatively, a user may have the option of placing her cursor above line 112 (located before the first thumbnail in the third group), press the backspace key, and cause the same combination of the second and third folders to be performed.

In some embodiments, a user has the ability to manually adjust the assignment of an image to a particular folder without necessarily changing the number of folders. For example, a user may select thumbnail 114 and drag it from the second group and associate it with the first group or the third group. In this embodiment, when a user is changing the association of an image with a folder, a rule associated with maintaining the temporal contiguousness of the groups is not necessarily followed. In some embodiments, the user is able to specify a reassigned image's placement or location within the ordering or sequence of a group of images.

Using options area 116, a user is able to (if so desired) specify or set a variety of download options. The first option is to open an organizer when the download is finished. The second option is to automatically fix red eye. For example, after downloading the selected images, a red eye correction process is automatically performed on the downloaded images. The third option is to automatically suggest photo stacks. In photo stacking, a single, representative image is displayed for a sub-group of images, where the sub-group of images depict similar content and/or have creation dates/times that are very close (e.g., a fraction of a second to a few seconds). For example, a sports photographer may configure his camera to take many pictures in a burst mode to capture fast-moving athletes. In some embodiments, photo stacks are suggested by analyzing the content depicted in the images and identifying images that contain similar content. In some embodiments, creation dates and/or times are analyzed. For example, images that are created within a fraction of a second or within a few seconds of each other may tend to have similar content. The fourth option is to make "Group Custom Name" a tag. A tag may be used to store metadata associated with an image and as an example, if the second folder is renamed "Boston," all images associated with the second folder would be tagged with "Boston" after downloading if that option is selected. The fifth option (implemented using a pull down menu) is to not delete originals (e.g., from F:\<NIKON D200>) after copying. Another selection (not shown) in the pull down menu may be to delete the originals after copying. These are some examples of options provided to a user; in some embodiments, some other set of optional features, capabilities, or processing is presented to a user.

Metadata portion 118 is associated with applying metadata information to the images to be downloaded. A user can (optionally) specify the author (e.g., photographer) and/or copyright information.

When a user has configured download interface 100 with her desired configurations, settings, and/or values, the user selects get photos button 120 and the download process is performed. For example, if get photos button 120 is pressed with download interface 100 in the state shown in FIG. 1B, the images would be downloaded to three folders called Folder 1, Folder 2, and Folder 3 in the My Pictures directory. After downloading is completed, Folder 1 would contain the three images shown in the first row, Folder 2 would contain the five images shown in the second row, and Folder 3 would contain the five images shown in the third row.

Figure 1C:
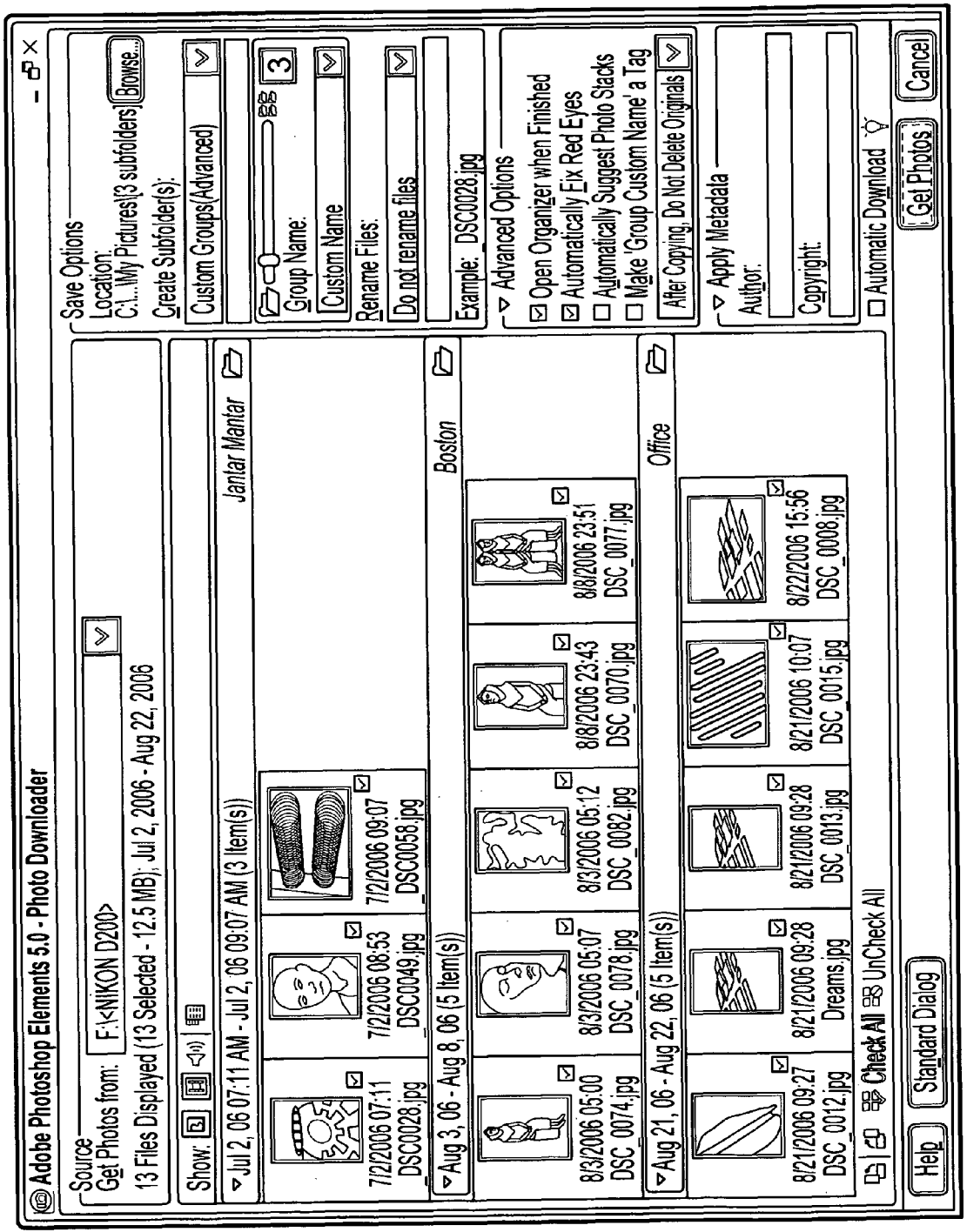
FIG. 1C is a diagram illustrating an embodiment of a download interface after a user has specified folder names.

FIG. 1C is a diagram illustrating an embodiment of a download interface after a user has specified folder names. In the example shown, a user has changed the default folder names shown in FIG. 1B to user-specified folder names. Folder 1 has been renamed Jantar Mantar, Folder 2 has been renamed Boston, and Folder 3 has been renamed Office.

In this example, a user renames a folder by placing a cursor over the folder name (e.g., "Folder 1"), double clicking a mouse button, and entering in the new name. In some embodiments, a user-specified folder name is added to the name of the images that are associated with that group. For example, the image associated with the first thumbnail in the first row with a name of "_DSC0028.jpg" may be renamed "Jantar Mantar_DSC0028.jpg" which is created by concatenating the folder name with the original file name.

In some embodiments, grouping techniques disclosed herein are used with some other application besides Adobe Photoshop Elements. Some examples of other applications include Adobe® Bridge, Adobe® Photoshop® Lightroom™, and Adobe® Photoshop®. In some embodiments, the techniques are used with an application that has a subset of features or functions compared to the examples described herein, such as an application that organizes images but does not have image editing capabilities (e.g., cropping, color adjustment, red eye correction, etc.). In some embodiments, an application that uses the disclosed grouping techniques has layout or placement related capabilities, for example to create websites, print documents, or scrapbook pages. In some embodiments, the disclosed grouping techniques are used by a web-based application that is accessed using an Internet browser application, such as Microsoft Internet Explorer or Mozilla Firefox.

Although some examples describe downloading (or more generally, the transfer of content), in some embodiments the techniques are not used during the transfer of content. For example, a grouping process may be used to organize images that are already stored in a desired location. In some embodiments, content to be organized is already stored on a user's computer. In some embodiments, a web-based application is used and/or the content is already stored remotely at a web server, a file server, etc.

In some embodiments, content (e.g., images) is not necessarily separated or placed into different folders or other target locations (e.g., within a file system) but are logically grouped and/or tagged. For example, in some applications the techniques are used with web-based applications or processes where images are organized logically (e.g., into photo albums) or have tags that record or track relationships between images and the images are not necessarily stored in separate locations or directories.

In some embodiments, the content being processed is associated with some other type of media in addition to or as an alternative to still images. Some examples of other types of media include audio, video (e.g., visual content that varies over time), etc.

Figure 2:
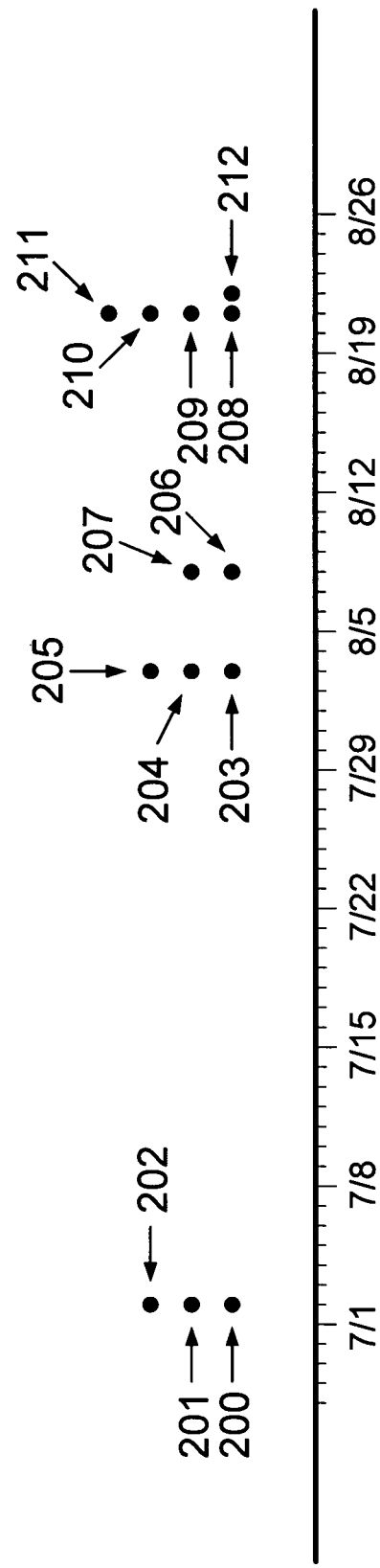
FIG. 2 is a timeline illustrating an example of creation dates associated with images to be downloaded.

FIG. 2 is a timeline illustrating an example of creation dates associated with images to be downloaded. In the example shown, the creation dates of the images shown in FIGS. 1A-1C are plotted. Each dot corresponds to an image and its location along the timeline is based on the corresponding image's creation date. Dots 200-212 are numbered based on their creation date; thus, the image corresponding to dot 200 is temporally adjacent to the image corresponding to dot 201, the image corresponding to dot 201 is temporally adjacent to the images corresponding to dots 200 and 202, etc.

To determine a grouping of images, gap values for temporally adjacent images are calculated and used to determine a grouping. For example, the gap value between dots 200 and 201 is 0 days (i.e., Jul. 2, 2006 minus Jul. 2, 2006), as is the gap between dots 201 and 202. The gap between dots 202 and 203 has a value of 32 days (i.e., Aug. 3, 2006–Jul. 2, 2006).

The only other non-zero gap values are the gap between dots 205 and 206 (i.e., 5 days=Aug. 8, 2006–Aug. 3, 2006), the gap between dots 207 and 208 (i.e., 13 days=Aug. 21, 2006–Aug. 8, 2006), and the gap between dots 211 and 212 (i.e., 1 day=Aug. 22, 2006–Aug. 21, 2006).

In some embodiments, creation times (i.e., hours, minutes and/or seconds) associated with a group of images are used when calculating gap values between temporally adjacent images. In some cases, time is used when a higher degree of granularity or precision is desired than that offered by days alone. For example, if the number of groups is relatively high compared to the number of images (e.g., where only one or two images are associated with a given group) it may be desirable to use time in addition to dates when calculating gap values. In some embodiments, time is used because a total gap value (i.e., the difference between the earliest creation date/time and the latest creation date/time) is relatively small. For example, if all the images are created in the same day or over the span of a few hours then it may be desirable to use time.

In some embodiments, gap values between temporally adjacent images are used to obtain an initial group of images. For example, when a user first provides a source location to a process, the process may automatically determine an initial grouping (e.g., assignment to a particular folder) of the images. In some embodiments, gap values are used in combination with some user input, setting, value, or configuration to determine groupings. For example, in FIGS. 1A-1C, a user may move slider 106, causing new groupings to be determined and displayed.

Figure 3:
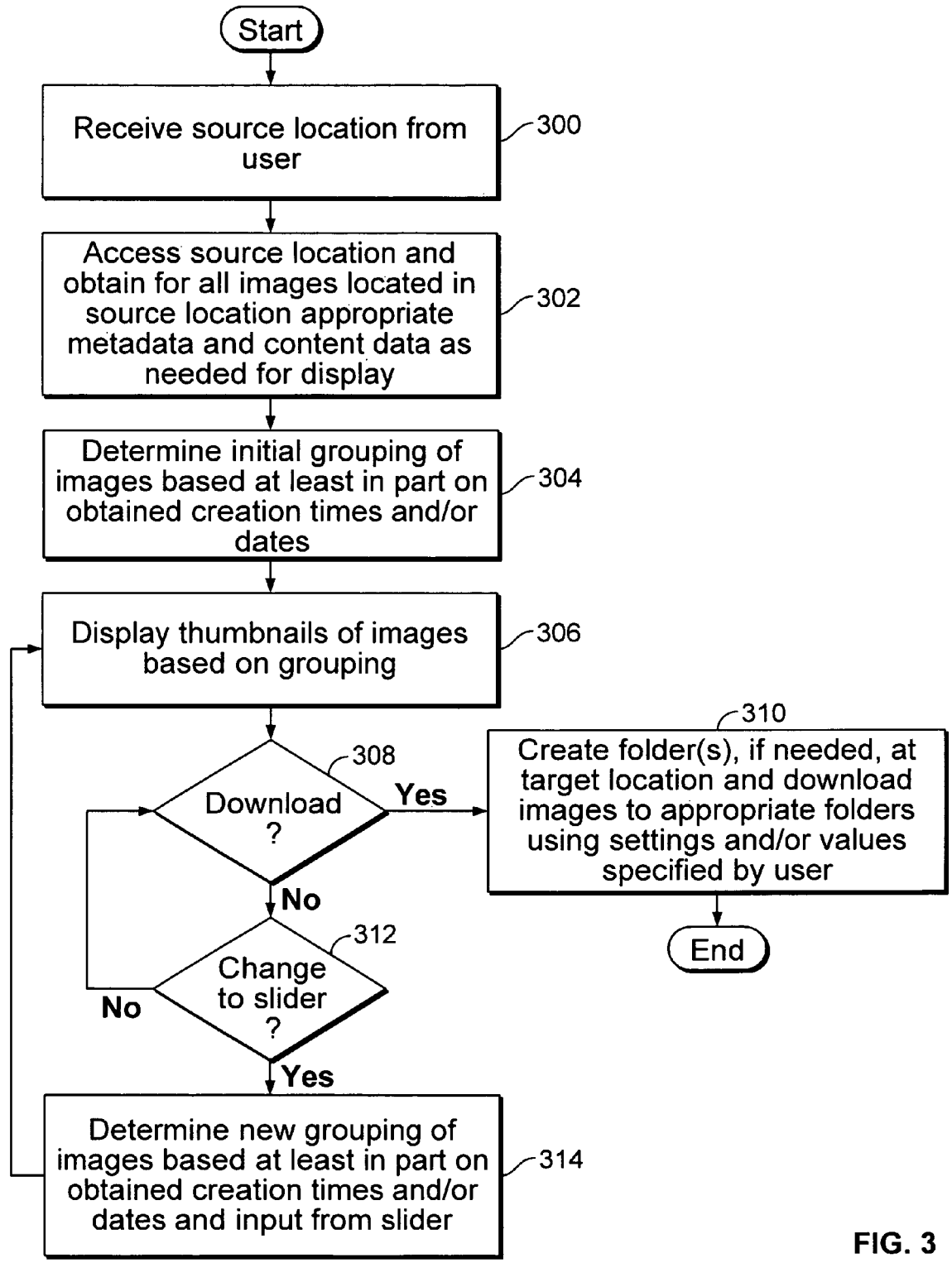
FIG. 3 is a flowchart illustrating an embodiment of a process for downloading images with some degree of user control over the grouping.

FIG. 3 is a flowchart illustrating an embodiment of a process for downloading images with some degree of user control over the grouping. In the example shown, the process is performed by download interface 100 of FIGS. 1A-1C. In some embodiments, a different interface is configured to offer a different set of operations and/or features and the example process is modified accordingly.

At 300, a source location is received from a user. In FIGS. 1A-1C, for example, a user specifies that the source location is F:\<NIKON D200>. At 302, the source location is accessed and for all images located in the source location, appropriate metadata and content data are obtained as needed for display. For example, download interface 100 in FIGS. 1A-1C is configured to display a thumbnail, a file name, and a creation date and time for each image. For that example system, the metadata obtained includes the file name and creation date/time, and the content data is used to display the thumbnail. Other embodiments are configured to display a different collection of information for each image and some other combination of content data and/or metadata is obtained.

At 304, an initial grouping of images is determined based at least in part on obtained creation times and/or dates. In this example, the initial grouping is determined at 304 without user input. A user is permitted to adjust or otherwise provide input regarding the grouping after the initial grouping is presented. An embodiment for determining an initial and/or subsequent grouping is described in further detail below. In some embodiments, all images are in a single group during an initial grouping. In some embodiments, an initial grouping has two or more groups. In some embodiments, there is no rule associated with the number of groups determined for an initial grouping. For example, in some cases, there will be a single group and in other cases there will be two or more groups. In some embodiments, an initial grouping is based on other factors.

At 306, thumbnails of the images are displayed based on a grouping. In download interface 100 of FIGS. 1A-1C, for example, images in the same group are displayed in rows together; different groups are separated by a horizontal bar with the folder name and the range of creation dates/times associated with that particular group displayed.

It is determined at 308 whether to download the images. For example, a user may trigger or initiate a download by pressing a "Get Photos" buttons using a mouse cursor. If it is determined that the images are to be downloaded, at 310 folder(s) are created, if needed, at a target location and images are downloaded to appropriate folders using settings and/or values specified by a user. Some examples of user settings and/or values include user-specified folder names, file names (e.g., an option to apply the folder name to the file name), other options (e.g., whether to identify and correct red-eye in the downloaded images; application of tags and, if so, the tag values; etc.), etc.

If a download is not performed, it is determined at 312 whether there is a change to a slider. In some embodiments, some other input mechanism or device besides a slider is used. Some examples include knobs, dials, up/down arrows, and input boxes (e.g., to enter a value within a range of values). Alternatively, a user may manually adjust a grouping by dragging and dropping a thumbnail. If there is no change to a slider, it is determined at 310 whether to download images.

If there is a change to a slider, a new grouping of images is determined based at least in part on obtained creation times and/or dates and input from a slider at 314. Thumbnails of the images are displayed based on the new grouping at 306.

In some embodiments, the same process is used to determine an initial grouping at 304 and determine a new grouping at 314. For example, when calculating the initial grouping, a user input value may be set to an initial or default value, and when calculating a new grouping at 314 the initial or default value is overwritten or replaced with a user-specified one. In some embodiments, a first process is used to determine an initial grouping at 304 and a second process is used to determine a new grouping at 314. For example, in some embodiments a process to determine a non-initial grouping includes capabilities or interfaces for a user to specify where to divide or break an existing group, indicate the merge or joining of two adjacent groups, etc.

Figure 4:
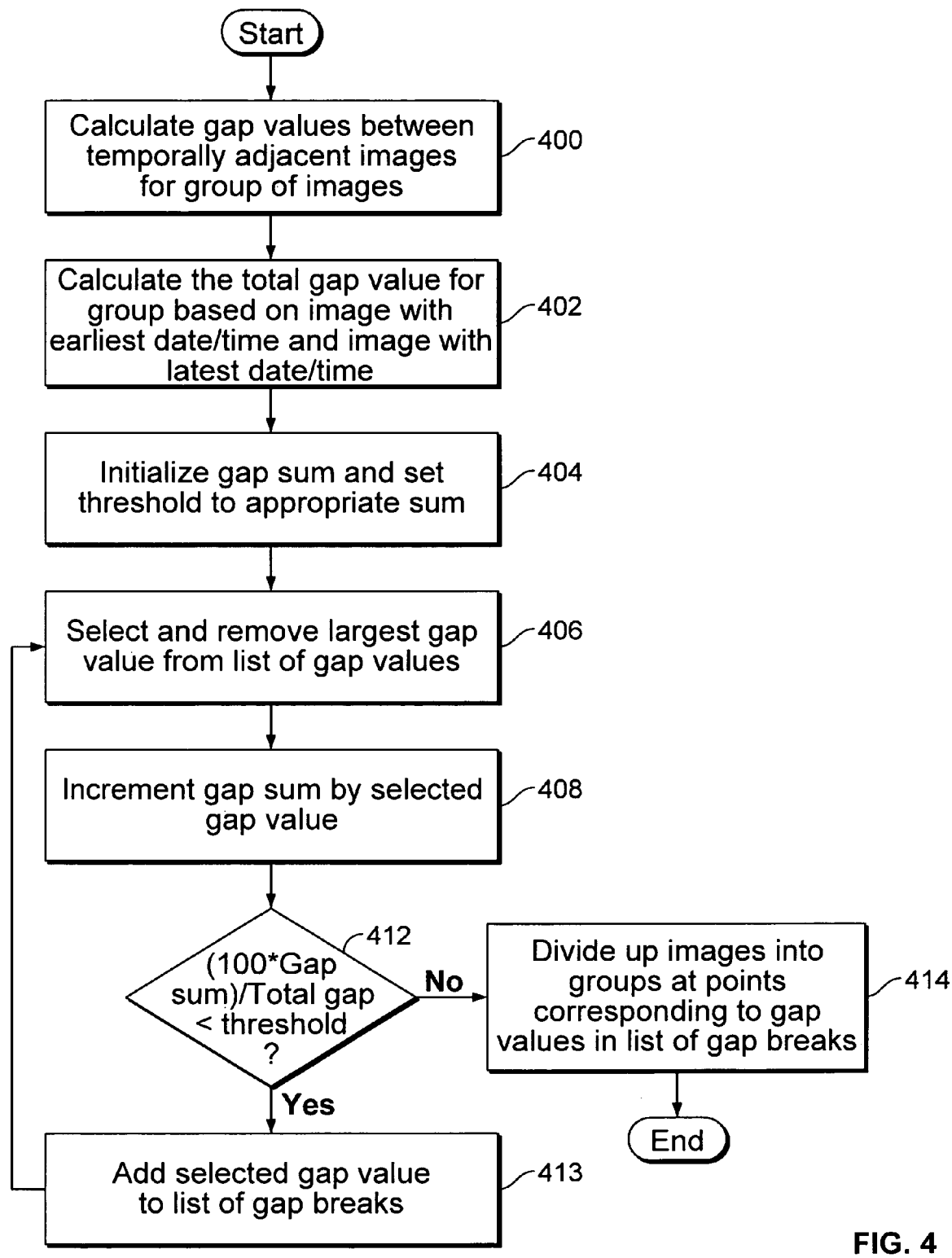
FIG. 4 is a flowchart illustrating an embodiment of a process for determining a grouping.

FIG. 4 is a flowchart illustrating an embodiment of a process for determining a grouping. In the example shown, the process may be performed at 304 to determine an initial grouping and/or at 314 to determine a new grouping using user input. In some embodiments, the threshold value set at 404 depends on whether the process is used to determine an initial grouping (e.g., the threshold is set to a default, initial or predefined value) or to determine a subsequent grouping (e.g., the threshold varies in accordance with the user input).

At 400, gap values between temporally adjacent images are calculated for group of images. The group of images referred to in step 400 is a group of images to be organized, such as images that are to be downloaded from removable storage media or a capture device, such as a digital camera, camera phone, audio recorder, camcorder, etc. At 402, the total gap value is calculated for the group based on the image with the earliest date/time and the image with the latest date/time.

The gap sum is initialized and the threshold is set to an appropriate sum at 404. In this example, the gap sum is initialized by setting it to zero and the threshold is a value between 0 and 100. In some embodiments, the threshold includes a fractional value. An appropriate value that the threshold is set to may depend on whether an initial grouping is being determined or a new grouping is being determined using user input. In some embodiments, if an initial grouping is being determined, the threshold is set to a predefined, default, or initial value (e.g., 90). In some embodiments, if user input is used to determine a grouping, the threshold varies in accordance with the user input. For example, an increase in a user-specified value or input may correspond to an increase in the threshold value.

At 406, the largest gap value is selected and removed from the list of gap values. In some embodiments, the list is sorted in ascending order and the top gap value in the sorted list (i.e., the largest gap value) is selected and removed. At 408, the gap sum is incremented by the selected gap value.

It is determined at 412 whether (100*gap sum)/total gap is less than the threshold. If so, at 413, the selected gap value is added to a list of gap breaks. This list identifies the points at which the images are divided into groups. The next largest gap value is then selected and removed from the list of gap values at 406.

If the comparison at 412 is not satisfied, at 414 the images are divided up into groups at points corresponding to the gap values in the list of gap breaks. In some embodiments, there is more than one gap with the same gap value and all gaps having a value in the list of gap breaks are points at which the images are divided into groups.

The example process of FIG. 4 may be repeated as needed. For example, the process may be performed once to determine an initial grouping and then may be repeated (as needed) in response to user input, e.g., as the user views presented groupings. In some embodiments, the process is performed in real time as a user adjusts a slider, knob or other input device. For example, download interface 100 in FIGS. 1A-1C may be refreshed in real time with updated groupings as slider 106 is moved to the left/right without the user necessarily deselecting slider 106 or releasing a mouse button.

In some embodiments, a statistical value is used in determining an initial or subsequent grouping. Some example statistical values include a mean, a standard deviation, and a variance. For example, in some embodiments the comparison at 412 uses the standard deviation of the gap values, for example as part of or to determine the threshold value. In some embodiments, a statistical value is modified, transformed, or processed, for example using a function, scaling factor, etc.

FIG. 5A is a diagram illustrating an embodiment of a grouping after a first iteration of a grouping process is performed. In the example shown, the creation dates shown in the timeline of FIG. 2 are processed using the flowchart of FIG. 4. As mentioned previously, only creation dates are used in the example of FIG. 2 but in some embodiments, times (i.e., hours, minutes, and/or seconds) are used in addition to dates. For example, in cases where the threshold is set to a relatively high value (e.g., 99.5), it may be desirable to include hours, minutes, and/or seconds in order to distinguish and differentiate between the smaller gap values that are zero in this example. In some cases, a total gap is relatively small (e.g., images that are created over a 24 hour period) and it is desirable to use hours, minutes, and/or seconds.

The gap values between temporally adjacent images determined at 400 using the example data are (0, 0, 32 days, 0, 0, 5 days, 0, 13 days, 0, 0, 0, 1 day). The total gap value is 51 days. The earliest creation date is Jul. 2, 2006 and the latest creation date is Aug. 22, 2006, which is a difference of 51 days.

In this example, the gap sum is initialized by setting it to zero and the threshold is set to 90. The largest gap value is then selected and removed. At the first iteration, the largest gap value is 32 days and this value is selected and removed from the list of gap values. The gap sum is incremented by 32 days and goes from 0 to 32 days.

The comparison at 412 is then performed. The left side of the comparison at the first iteration is (100*32 days)/51 days or approximately 62.7, which is less than the right side of the comparison (i.e., 90). Since the comparison is true, the gap value of 32 days is added to the gap break list.

In the example shown, a dotted line is shown at the point corresponding to the gap value of 32 days. Thus, after the first iteration using the example process and the example data, there are two groups. The first group includes the three images to the left of the dotted line and the second group includes the ten images to the right of the dotted line.

Figure 5B:
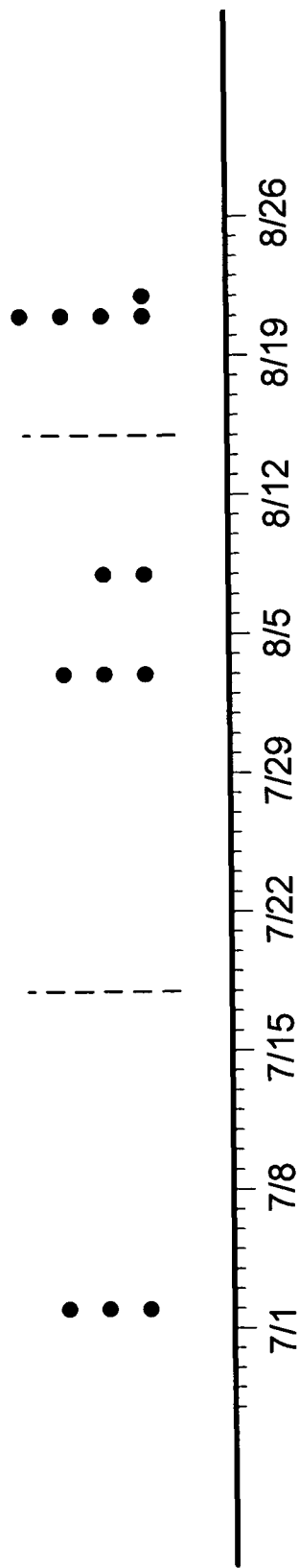
FIG. 5B is a diagram illustrating an embodiment of a grouping after a second iteration of a grouping process is performed.

FIG. 5B is a diagram illustrating an embodiment of a grouping after a second iteration of a grouping process is performed. In the example shown, the list of gap values at the start of the second iteration is (0, 0, 0, 0, 5 days, 0, 13 days, 0, 0, 0, 1 day) since the gap value of 32 days was removed in the first iteration, and the gap sum is 32 days.

The largest gap value is now 13 days and this gap value is selected and removed from the list of gap values. The gap sum is incremented by 13 days from 32 days to 45 days. At the second iteration, the left side of the comparison at 412 is (100*45 days)/51 days or approximately 88.2, which is still less than 90. The gap value of 13 days is therefore added to the list of gap breaks.

In the figure shown, a second dotted line has been added at the point corresponding to the gap value of 13 days. After two iterations there are three groups, separated or otherwise divided by the dotted lines shown. The group on the left has three images, the center group has five images, and the group on the right has five images.

At the third iteration, the largest gap value remaining in the list is 5 days. The gap sum is incremented from 45 days to 50 days. At the third iteration, the comparison fails since the left side of the comparison is (100*50 days)/51 days or approximately 98.0, which is greater than 90. The gap value of 5 days is thus not added to the gap break list, and the grouping shown in FIG. 5B is the grouping presented.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   obtaining gap values for a collection of images, wherein each gap value is a temporal difference between temporally adjacent images;
   using a processor to determine a first grouping of the collection of images, resulting in a first number of groups, based at least in part on the gap values, wherein the first grouping is performed such that each group in the first grouping is temporally contiguous;
   presenting the first grouping;
   receiving input from a user in response to the presented first grouping that includes a second number of groups that is different from the first number of groups;
   using the processor to determine a second grouping of the collection of images, resulting in the second number of groups, based at least in part on the second number of groups and the gap values, wherein the second grouping is performed such that each group in the second grouping is temporally contiguous;
   presenting the second grouping via a user interface, including by:
      for each group in the second grouping, presenting, via the user interface, a corresponding target directory on a file system, wherein each group in the second grouping corresponds to a different target directory; and presenting, via the user interface, at least one image from each group in the second grouping;

receiving an indication associated with storing the collection of images grouped according to the second grouping; and in response to receiving the indication, storing at least one image from each group in the second grouping in its corresponding target directory on the file system.

2. A method as recited in claim 1 further comprising receiving additional user input that includes one or more of the following: an indication of a point at which to divide an existing group of images into two groups of images; an indication of a first group of images and a second group of images to be merged, wherein the first group and the second group are temporally adjacent; a reassignment of an image from a first group to a second group such that the number of groups does not change; or a reassignment of an image from a first group to a second group such that the number of groups does not change and the first group and the second group are no longer temporally contiguous.

3. A method as recited in claim 1, wherein the user input includes either a first indication corresponding to an increase in the number of groups or a second indication corresponding to a decrease in the number of groups.

4. A method as recited in claim 1, wherein the user input is received via a dial or a slider.

5. A method as recited in claim 1, wherein at least one of determining the first grouping or determining the second grouping includes using a total gap value that is calculated based on (1) the earliest creation value in the collection and (2) the latest creation value in the collection.

6. A method as recited in claim 1, wherein at least one of determining the first grouping or determining the second grouping includes:

beginning with the largest gap value associated with the collection of images, evaluating a gap value; and if the evaluated gap value does not satisfy a criteria, defining groups by creating breaks at points corresponding to gap values that are greater than or equal to the gap value that did not satisfy the criteria.

7. A method as recited in claim 1, wherein determining the first grouping or determining the second grouping includes using a statistical value associated with the gap values.

8. A method as recited in claim 1, wherein the collection of images is obtained from a source location specified by the user.

9. A method as recited in claim 1 further comprising one or more of the following: receiving a target location specified by the user to which the collection of images is to be transferred, receiving an indication to perform an automatic image editing process on the collection of images, associating a given group with a group name specified by the user, naming images in a given group using a group name specified by the user, tagging images in a given group using a group name specified by the user.

10. A method as recited in claim 1 further comprising creating one or more of said corresponding directories on the file system if any corresponding directory does not already exist on the file system.

11. A method as recited in claim 1, wherein at least one of determining the first grouping or determining the second grouping further includes: if it is determined that a percentage associated with a gap sum and a total gap is not greater than or equal to the threshold:

adding a next largest gap value to the gap sum to obtain an updated gap sum; and determining if the percentage associated with the updated gap sum and the total gap is greater than or equal to the threshold; and if it is determined that the percentage associated with the updated gap sum and the total gap is greater than or equal to the threshold, ending the grouping process.

12. A method as recited in claim 1, wherein at least one of the one or more corresponding target directories is user-specified.

13. A method as recited in claim 12, wherein presenting the one or more corresponding target directories includes:

for each group resulting from the second grouping, presenting, via the user interface, a suggested corresponding target directory on the file system; and after presenting the one or more suggested corresponding target directories, receiving, for at least one group in the second grouping, a user-specified corresponding target directory via the user interface.

14. A system, comprising:

a processor; and a memory coupled with the processor, wherein the memory is configured to provide the processor with instructions which when executed cause the processor to:

obtain gap values for a collection of images, wherein each gap value is a temporal difference between temporally adjacent images;

determine a first grouping of the collection of images, resulting in a first number of groups, based at least in part on the gap values, wherein the first grouping is performed such that each group is temporally contiguous;

present a first grouping;

receive input from a user in response to the presented first grouping that includes a second number of groups that is different from the first number of groups;

determine a second grouping of the collection of images, resulting in the second number of groups, based at least in part on the second number of groups and the gap values, wherein the second grouping is performed such that each group in the second grouping is temporally contiguous;

present the second grouping via a user interface, including by:

for each group in the second grouping, presenting, via the user interface, a corresponding target directory on a file system, wherein each group in the second grouping corresponds to a different target directory; and presenting, via the user interface, at least one image from each group in the second grouping;

receive an indication associated with storing the collection of images grouped according to the second grouping; and in response to receiving the indication, store at least one image from each group in the second grouping in its corresponding target directory on the file system.

15. A system as recited in claim 14, wherein the memory is further configured to provide the processor with instructions which when executed cause the processor to create one or more of said corresponding directories on the file system if any corresponding directory does not already exist on the file system.

16. A system as recited in claim 14, wherein the instructions for at least one of determining the first grouping or determining the second grouping include instructions for: if it is determined that a percentage associated with a gap sum and a total gap is not greater than or equal to the threshold:

adding a next largest gap value to the gap sum to obtain an updated gap sum; and determining if the percentage associated with the updated gap sum and the total gap is greater than or equal to the threshold; and if it is determined that the percentage associated with the updated gap sum and the total gap is greater than or equal to the threshold, ending the grouping process.

17. A system as recited in claim 14, wherein at least one of the one or more corresponding target directories is user-specified.

18. A system as recited in claim 17, wherein the instructions for presenting the one or more corresponding target directories include instructions for:

for each group resulting from the second grouping, presenting, via the user interface, a suggested corresponding target directory on the file system; and after presenting the one or more suggested corresponding target directories, receiving, for at least one group in the second grouping, a user-specified corresponding target directory via the user interface.

19. A computer program product, the computer program product being embodied in a tangible computer readable storage medium and comprising computer instructions for:

obtaining gap values for a collection of images, wherein each gap value is a temporal difference between temporally adjacent images;

determining a first grouping of the collection of images, resulting in a first number of groups, based at least in part on the gap values, wherein the first grouping is performed such that each group in the first grouping is temporally contiguous;

presenting the first grouping;

receiving input from a user in response to the presented first grouping that includes a second number of groups that is different from the first number of groups;

determining a second grouping of the collection of images, resulting in the second number of groups, based at least in part on the second number of groups and the gap values, wherein the second grouping is performed such that each group in the second grouping is temporally contiguous;

presenting the second grouping via a user interface, including by:

for each group in the second grouping, presenting, via the user interface, a corresponding target directory on a file system, wherein each group in the second grouping corresponds to a different target directory; and presenting, via the user interface, at least one image from each group in the second grouping;

receiving an indication associated with storing the collection of images grouped according to the second grouping; and in response to receiving the indication, storing at least one image from each group in the second grouping in its corresponding target directory on the file system.

20. A computer program product as recited in claim 19 further comprising computer instructions for creating one or more of said corresponding directories on the file system if any corresponding directory does not already exist on the file system.

21. A computer program product as recited in claim 19, wherein the computer instructions for at least one of determining the first grouping or determining the second grouping further include computer instructions for: if it is determined that a percentage associated with a gap sum and a total gap is not greater than or equal to the threshold:

adding a next largest gap value to the gap sum to obtain an updated gap sum; and determining if the percentage associated with the updated gap sum and the total gap is greater than or equal to the threshold; and if it is determined that the percentage associated with the updated gap sum and the total gap is greater than or equal to the threshold, ending the grouping process.

22. A computer program product as recited in claim 19, wherein at least one of the one or more corresponding target directories is user-specified.

23. A computer program product as recited in claim 22, wherein the computer instructions for presenting the one or more corresponding target directories include computer instructions for:

for each group resulting from the second grouping, presenting, via the user interface, a suggested corresponding target directory on the file system; and after presenting the one or more suggested corresponding target directories, receiving, for at least one group in the second grouping, a user-specified corresponding target directory via the user interface.

* * * * *